United States Patent
Mitomo et al.

(10) Patent No.: US 7,906,040 B2
(45) Date of Patent: Mar. 15, 2011

(54) α-SIALON, α-SIALON PHOSPHOR AND METHOD FOR PRODUCING THE SAME

(75) Inventors: Mamoru Mitomo, Ibaraki (JP); Naoto Hirosaki, Ibaraki (JP); Hideyuki Emoto, Tokyo (JP); Masahiro Ibukiyama, Tokyo (JP)

(73) Assignees: National Institute for Materials Science, Tsukuba-shi, Ibaraki (JP); Denki Kagaku Kogyo Kabushiki Kaisha, Tokyo (JP)

(*) Notice: Subject to any disclaimer, the term of this patent is extended or adjusted under 35 U.S.C. 154(b) by 1055 days.

(21) Appl. No.: 11/629,467

(22) PCT Filed: Jun. 14, 2005

(86) PCT No.: PCT/JP2005/011207
§ 371 (c)(1), (2), (4) Date: Dec. 14, 2006

(87) PCT Pub. No.: WO2005/123876
PCT Pub. Date: Dec. 29, 2005

(65) Prior Publication Data
US 2008/0064586 A1    Mar. 13, 2008

(30) Foreign Application Priority Data
Jun. 18, 2004 (JP) ................. 2004-181819

(51) Int. Cl.
C09K 11/08    (2006.01)
C09K 11/66    (2006.01)
C09K 11/61    (2006.01)
C09K 11/02    (2006.01)
C09K 11/77    (2006.01)

(52) U.S. Cl. ..... 252/301.4 F; 252/301.4 H; 252/301.4 R

(58) Field of Classification Search ........... 252/301.4 R, 252/304.4 F, 301.4 H, 301.6 F
See application file for complete search history.

(56) References Cited

U.S. PATENT DOCUMENTS

| | | | |
|---|---|---|---|
| 6,066,861 A | 5/2000 | Hohn et al. | |
| 7,262,439 B2* | 8/2007 | Setlur et al. | 257/98 |
| 7,439,668 B2* | 10/2008 | Setlur et al. | 313/503 |
| 7,445,730 B2* | 11/2008 | Nagatomi et al. | 313/503 |
| 2002/0155940 A1 | 10/2002 | Kobayashi | |
| 2003/0030038 A1 | 2/2003 | Mitomo et al. | |
| 2007/0278510 A1* | 12/2007 | Sakuma et al. | 257/98 |
| 2009/0021141 A1* | 1/2009 | Emoto et al. | 313/503 |

FOREIGN PATENT DOCUMENTS

| | | |
|---|---|---|
| JP | 6-287064 A | 10/1994 |
| JP | 2002-226274 A | 8/2002 |
| JP | 2002-249769 A | 9/2002 |
| JP | 2002-363554 A | 12/2002 |
| JP | 2003-124527 A | 4/2003 |
| JP | 2003-206481 A | 7/2003 |
| JP | 2003-336059 A | 11/2003 |
| JP | 2004-67837 A | 3/2004 |
| JP | 2006-524425 A | 10/2006 |
| WO | 2004/097949 A1 | 11/2004 |

OTHER PUBLICATIONS

Forms PCT/IB/338; PCT/IB/373 and PCT/ISA/237 issued in corresponding International Application PCT/JP2005/011207 mailed Jan. 4, 2007.
International Search Report of PCT/JP2005/011207, date of mailing Oct. 4, 2005.

* cited by examiner

Primary Examiner — C. Melissa Koslow
Assistant Examiner — Matthew E Hoban
(74) Attorney, Agent, or Firm — Westerman, Hattori, Daniels & Adrian, LLP

(57) ABSTRACT

An α-sialon is offered which is represented by general formula: $(M1)_X(M2)_Y(Si, Al)_{12}(O, N)_{16}$ (wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$), the α-sialon containing from 30 ppm to 1% of fluorine as an impurity. By making primary particles of the α-sialon 1 to 10 μm in average particle size, an α-sialon phosphor can be obtained reproducibly, stably and in a large quantity. Especially, if containing 30 to 200 ppm of impurity fluorine, the α-sialon phosphor can exhibit an excellent emission characteristic as a white fluorescent matter.

18 Claims, 4 Drawing Sheets

FIG. 1

|  | Composition (mol %) | | | | | $CaF_2$ / ($CaCO_3$ + $CaF_2$) (mol %) |
|---|---|---|---|---|---|---|
|  | $Si_3N_4$ | AlN | $Eu_2O_3$ | $CaCO_3$ | $CaF_2$ |  |
| Example 1 | 50.3 | 37.7 | 0.6 | 0 | 11.4 | 100 |
| Example 2 | 50.3 | 37.7 | 0.6 | 5.7 | 5.7 | 50 |
| Example 3 | 50.3 | 37.7 | 0.6 | 8.5 | 2.9 | 25 |
| Comparative 1 | 50.3 | 37.7 | 0.6 | 11.4 | 0 | 0 |
| Comparative 2 | 45.2 | 33.8 | 0.5 | 0 | 20.5 | 100 |

FIG. 2

|  | Crystal Phase (Proportion) | Total F Content (ppm) | Solid-Dissolving F Content (ppm) | Average Primary Particle Size (SEM) | Average Particle Size ($\mu$m) (Laser Diffraction Scattering) |
|---|---|---|---|---|---|
| Example 1 | $\alpha$-sialon (95 wt %) AlN (3 wt %) EuOF (2 wt %) | 4000 | 80 | 5.8 | 8.2 |
| Example 2 | $\alpha$-sialon (100 wt %) | 1000 | 60 | 4.7 | 7.5 |
| Example 3 | $\alpha$-sialon (100 wt %) | 400 | 40 | 3.4 | 6.3 |
| Comp. 1 | $\alpha$-sialon (100 wt %) | < 10 | < 10 | 0.8 | 7.2 |
| Comp. 2 | $\alpha$-sialon (91 wt %) AlN (3 wt %) EuOF (4 wt %) | 23000 | 100 | 0.8 | 7.2 |

(a)

(b)

(c)

α-SIALON, α-SIALON PHOSPHOR AND METHOD FOR PRODUCING THE SAME

TECHNICAL FIELD

The present invention relates to an α-sialon that can be utilized, among others, for a phosphor for a white light emitting diode which uses a blue or ultraviolet light emitting diode as its light source, and an α-sialon phosphor as well as a method for producing the same.

BACKGROUND ART

Being a solid solution of a type silicon nitride, an α-sialon (Si—Al—O—N) because of its high hardness and excellent wear resistance, high-temperature strength and oxidation resistance is finding its uses in such as slide members and high-temperature resistant structural components.

The α-sialon has a structure in which atoms of a specific element (such as Ca, Li, Mg, Y, or one or more lanthanoid except La and Ce) are entered into the crystal lattice to form a solid solution while maintaining their electrical neutrality so that the Si—N bond is partly substituted with the Al—N bond (partly also with the Al—O bond). In recent years, after the discovery that by suitably selecting the element for this entry and solid dissolving, fluorescence properties which are useful for a white light emitting diode (hereinafter referred to as "white LED") can be revealed, its putting to practical use has been under investigation (See References 1 to 5.).

A conventional α-sialon for use as a slide member, structural component or the like has been made in the form of a dense sintered body. In this case, a mass of mixed powders of silicon nitride ($Si_3N_4$), aluminum nitride (AlN) and an oxide of a solid-dissolving element is sintered in a nitrogen atmosphere under normal or gas pressure or by hot pressing or the like to form a solid solution while densifying the mass simultaneously. This is to ensure that a liquid phase formed of a surface oxide layer of silicon nitride and aluminum nitride and the oxide of the solid-dissolving element during the sintering process allows the mass densification to proceed and in the latter period of the sintering process the liquid phase is solid-dissolved within the powder grains so as not to leave a glass phase at the grain boundaries.

In the case where a mass of α-sialon powder is used as the starting material, sintering even at a temperature close to its decomposition temperature does not allow the mass to be densified well and does necessitate an assistant in order to form the liquid phase with the result that the glass phase is then left at the grain boundaries. For reasons such as that such a grain boundary glass phase is undesirable in mechanical properties, the α-sialon powder has little been used as the starting material for uses of α-sialon in slide members, structural components and the like. On the other hand, while a phosphor for white LED is used in which particles of submicron to micron size are dispersed in a sealing material such as epoxides, it is the present situation that, for the reason stated above, any α-sialon powder has never been marketed.

As a typical process of synthesizing an α-sialon powder, the reduction nitridation method can be cited in which a mass of mixed powders of aluminum oxide ($Al_2O_3$), silicon oxide ($SiO_2$) and an oxide of a metal which is to be solid-dissolved in the lattice is heat-treated in the presence of carbon in a nitrogen atmosphere as described in References 6 to 9 below. Although this method has the feature that the α-sialon powder can be synthesized at a relatively low temperature around 1500° C. from the source powders which are inexpensive, not only a plurality of intermediate products in the synthesis process, but also the production of gas components such as SiO and CO has made it difficult to yield a product which is of single phase and to control the composition and granular size strictly. An α-sialon powder can also be obtained by firing at high temperature a mixture of silicon nitride, aluminum nitride and an oxide of an element which is to be solid-dissolved in the lattice and then pulverizing the resultant sintered body of α-sialon.

Reference 1: Japanese Patent Laid Open Application, JP 2002-363554 A

Reference 2: Japanese Patent Laid Open Application, JP 2003-336059 A

Reference 3: Japanese Patent Laid Open Application, JP 2003-124527 A

Reference 4: Japanese Patent Laid Open Application, JP 2003-206481 A

Reference 5: J. W. H. van Krebel, "On new rare-earth doped M-Si—Al—O—N materials", TU Eidhoven, The Netherlands, p. 145-161 (1998)

Reference 6: M. Mitomo et al., "Preparation of α-Sialon Powders by Carbothermal Reduction and Nitridation", Ceram. Int., 14, 43-48 (1998)

Reference 7: J. W. T. van Rutten et al., "Carbothermal Preparation and Characterization of Ca-α-SiAlON", J. Eur. Ceram. Soc., 15, 599-604 (1995)

Reference 8: K. Komiya et al., "Hollow Beads Composed of Nanosize Ca α-SiAlON Grains", J. Am. Ceram. Soc., 83, 995-997 (2000)

The conventional methods of making an α-sialon powder require a pulverization treatment under severe conditions in order to obtain the powder of a desired particle size, because intergranular bonds by liquid phase sintering in the firing process remain firm. As the pulverizing conditions become severer, the problem arises that the chances of entry of impurities are increased and also of entry of defects onto individual particle surfaces.

The use as a phosphor of an α-sialon powder as made by the conventional methods poses the problem that inasmuch as it is the particle surface area which mainly is responsive to excitation light, the defects introduced into such surface areas largely affect its fluorescent properties and cause its light emitting characteristic to deteriorate.

DISCLOSURE OF THE INVENTION

With these problems taken into account, it is a first object of the present invention to provide an α-sialon that can be an excellent phosphor material for a white LED which uses a blue light emitting diode (hereinafter referred to as "blue LED") or ultraviolet light emitting diode (hereinafter referred to as "ultraviolet LED") as its light source, and to provide such an α-sialon phosphor.

It is a second object of the present invention to provide a method of making an α-sialon phosphor, whereby such an α-sialon phosphor can be made reproducibly, stably and in a large quantity.

Upon various examinations made based on experiments on phosphors using α-sialon as the host material, the present inventors have come to acquire the knowledge that fluorescent properties of a phosphor are largely influenced not only by chemical properties of α-sialon such as its compositions and purities but also by crystallographic characteristics of its particle surfaces and the presence of very small amounts of fluorine impurity therein, and have arrived at the present invention.

Hereinafter, the contents of impurities unless otherwise indicated are shown by mass proportions.

Thus, in order to attain the first object mentioned above, there is provided in accordance with the present invention an α-sialon characterized in that it is represented by general formula: $(M1)_X(M2)_Y(Si, Al)_{12}(O, N)_{16}$ (wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$) and that it contains not less than 30 ppm and not more than 1% of fluorine as an impurity.

In the makeup mentioned above, the α-sialon preferably contains 30 to 200 ppm of impurity fluorine, and preferably, M1 is Ca and $0.01<Y/(X+Y)<0.7$.

According to the makeup mentioned above, incorporating the fluorine content allows an α-sialon to be obtained in which the intergranular sintering is as limited as possible. The α-sialon thus obtained can easily be finely divided by crushing or pulverization even of disintegration agglomerates, into particles of a particle size which is ideal to form a phosphor.

The present invention also provides an α-sialon phosphor of which an α-sialon is represented by general formula: $(M1)_X(M2)_Y(Si, Al)_{12}(O, N)_{16}$, wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$, characterized in that it comprises particles of the α-sialon containing not less than 30 ppm and not more than 1% of fluorine as an impurity, whose primary particle size in average ranges between 1 and 10 μm.

In the makeup mentioned above, the α-sialon preferably contains 30 to 200 ppm of impurity fluorine, and preferably, M1 is Ca and $0.01<Y/(X+Y)<0.7$.

According to the makeup mentioned above, an α-sialon with the fluorine content can be finely divided in a mild crushing or pulverizing treatment process step into a particulate α-sialon phosphor having the primary particles whose size in average ranges between 1 and 10 μm. The α-sialon phosphor can thus be obtained which is free of surface defects and capable of emitting light with its peak wavelengths from orange to yellow colors in response to excitation by the blue LED or ultraviolet LED.

In order to achieve the second object mentioned above, there is provided in accordance with the present invention a method of making a phosphor mainly constituted of an α-sialon that is represented by general formula: $(Ca_X, M_Y)(Si, Al)_{12}(O, N)_{16}$ (wherein M represents one or more elements selected from the group which consists of Ce, Pr, Eu, Tb, Yb and Er and wherein $0.3<X+Y<1.5$ and $0<Y<0.7$), characterized in that the method comprises: heating a mixed powdery material comprising powders of (a) silicon nitride, (b) aluminum nitride, (c) calcium fluoride and (d) an oxide or nitride of M and at need (e) aluminum oxide to form a product thereof; and crushing the product into particles of a desired particle size.

In the method mentioned above, it is preferable that after said heat treatment a residual fluoride be removed by acid treatment. Also, preferably a portion of said calcium fluoride is substituted with calcium oxide or a calcium compound which when heated gives rise to calcium oxide. It is further preferable that said calcium fluoride have a proportion of 10 to 100 mol %.

The present invention also provides a method of making a phosphor mainly constituted of an α-sialon that is represented by general formula: $(Ca_X, M_Y)(Si, Al)_{12}(O, N)_{16}$ wherein M represents one or more elements selected from the group which consists of Ce, Pr, Eu, Tb, Yb and Er and wherein $0.3<X+Y<1.5$ and $0<Y<0.7$, characterized in that the method comprises: heating a mixed powdery material comprising powders of (a) silicon nitride, (b) aluminum nitride, (c) an oxide or nitride of calcium and (d) an oxide or nitride of M and at need (e) aluminum oxide and incorporating as a flux a fluoride of an element of II A group except Be, Mg and Ca or an element of IV A group to form a product thereof; and crushing the product into particles of a desired particle size.

In the method mentioned above, it is preferable that subsequent to crushing, the flux that may still remain be removed.

According to the aforementioned method of manufacture, it is possible to make an α-sialon powder of an optimum composition and particle size stably and in a large quantity as a phosphor for white LEDs. Also, an α-sialon phosphor as thus made can be obtained by mild crushing treatment working conditions and is excellent in light emitting characteristic with no surface defect by working strain introduced.

BRIEF DESCRIPTION OF THE DRAWINGS

In the drawings,

FIG. 1 is a table showing the compositions (mol %) of raw materials and $CaF_2/(CaCO_3+CaF_2)$ (mol %) in Examples 1 to 3 and Comparative Examples 1 and 2;

FIG. 2 is a table showing the crystal phase proportions of α-sialon, the total amounts of impurity fluorine (total F content; ppm unit), the contents of solid-dissolving fluorine (contents of solid-dissolving F; ppm unit), the average particle sizes (μm) of primary particles by SEM observation and the average particle sizes (μm) in particle size distribution measurement by laser diffraction scattering method in Examples 1 to 3 and Comparative Examples 1 and 2;

BEST MODES FOR CARRYING OUT THE INVENTION

Figure 3:
FIG. 3 are photographs showing scanning electron microscopic (SEM) images of α-sialon phosphors in (a) Example 1, (b) Example 2 and (c) Comparative Example 1, respectively.
Figure 3:
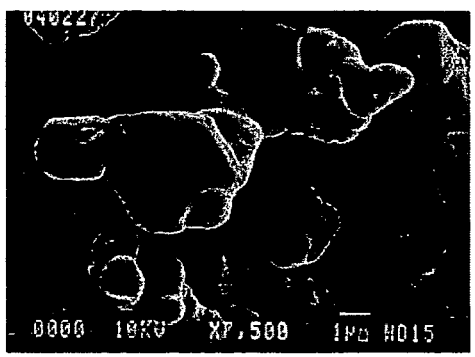
Figure 3:
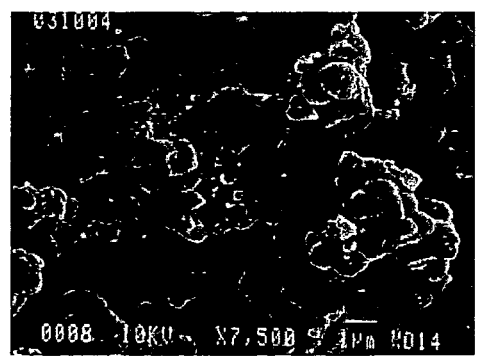

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof.

Hereinafter, forms of implementation of the present invention will be described in detail with reference to the drawing Figures. Mention is first made of an α-sialon according to a first form of implementation.

First Form of Implementation

The α-sialon according to the first form of implementation of the present invention is represented by general formula: $(M1)_X(M2)_Y(Si, Al)_{12}(O, N)_{16}$ wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$, and contains not less than 30 ppm and not more than 1% of fluorine as an impurity.

The α-sialon according to the first form of implementation of the present invention if M1 is Ca is represented by general formula: $Ca_X(M2)_Y(Si,Al)_{12}(O,N)_{16}$ wherein M2 represents one or more elements selected from the group which consists of Ce, Pr, Eu, Tb, Yb and Er and preferably wherein $0.01<Y/(X+Y)<0.7$.

It does not matter if there is a residue of the raw materials that may in part remain unreacted or a fluorine containing residue insofar as the α-sialon is the main component, but the addition of fluorine in an amount more than necessary is undesirable from the aspect of light emission efficiency. Investigations of the relationship between the amount of impurity fluorine and the light emission characteristic have revealed that the preferred content of fluorine is from 30 ppm to 1%. With a fluorine content less than 30 ppm, only a product in which primary particles are too fine in particle size and intergranular sintering has proceeded too far is obtained. With a fluorine content more than 1 weight %, the α-sialon particle surfaces are covered with the second phase that contains fluorine, which lowers the emission characteristic sharply. To further better the emission characteristic, the content of impurity fluorine is preferably from 30 to 200 ppm.

The α-sialon according to the first form of implementation of the present invention can be made, as will be later described, so that intergranular sintering is as limited as possible by using calcium fluoride as a portion of its raw materials to cause grains to grow while retarding nucleation of the α-sialon. The α-sialon thus obtained can be finely pulverized by crushing even of disintegration of agglomerates into particles of particle size that is optimum, e.g., to form a phosphor.

Second Form of Implementation

A second form of implementation of the present invention resides in an α-sialon phosphor of which an α-sialon is represented by general formula: $(M1)_X(M2)_Y(Si,Al)_{12}(O,N)_{16}$ wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$ and contains not less than 30 ppm and not more than 1% of fluorine as an impurity, the phosphor comprising primary particles of the α-sialon whose particle size in average ranges between 1 and 10 μm.

The α-sialon phosphor according to the second form of implementation of the present invention if M1 is Ca is represented by general formula: $Ca_X(M2)_Y(Si,Al)_{12}(O,N)_{16}$ (wherein M2 represents one or more elements selected from the group which consists of Ce, Pr, Eu, Tb, Yb and Er) and wherein $0.01<Y/(X+Y)<0.7$) and comprises primary particles whose particle size in average ranges between 1 and 10 μm.

In the α-sialon phosphor according to the second form of implementation of the present invention, it does not matter if there is a residue of the raw materials that may in part remain unreacted or a fluorine containing residue insofar as the α-sialon is the main component, but the addition of fluorine in an amount more than necessary is undesirable in the aspect of light emission efficiency. Investigations of the relationship between the amount of impurity fluorine and the light emission characteristic have revealed that the preferred content of fluorine is from 30 ppm and 1%. With a fluorine content less than 30 ppm, only a product in which primary particles are too fine in size and intergranular sintering has proceeded too far is obtained. With a fluorine content more than 1 weight %, the α-sialon particle surfaces are covered with the second phase that contains fluorine, which lowers the emission characteristic sharply. To further better the emission characteristic, the content of impurity fluorine is preferably from 30 to 200 ppm.

In the α-sialon according to the second form of implementation of the present invention, the α-sialon can be made so that intergranular sintering is as limited as possible by using calcium fluoride as a portion of its raw materials to cause grains to grow while retarding nucleation of the α-sialon. The α-sialon thus obtained can be finely pulverized by crushing even of disintegration of agglomerates into particles of the particle size which in average ranges from 1 to 10 μm. The α-sialon phosphor according to the second form of implementation, which can be made under mild crushing conditions and hence with no surface defect introduced onto fine particle surfaces and with impurities hard to enter, can exhibit good light emitting characteristic.

In a more preferred form of implementation of the invention, it is desirable to remove the second phase containing fluorine not solid-dissolving into the α-sialon particles upon acid treatment after heat treatment for synthesizing the α-sialon, as will be described later. Such a fluoride is soluble in an acid such as nitric acid and its content can be controlled by the acid treatment. A portion of fluorine is solid-dissolved into the crystallographic structure of α-sialon and contributes to an improvement in the light emission characteristic.

The α-Sialon obtained by the heating is in the form of blocks, which are pulverized by disintegrating or crushing and as the case may be in combination with a sieving operation into a powder of a desired particle size for application to one of a variety of uses.

According to results of examination by the inventors, it is desirable that for the use of the α-sialon in a phosphor for a white LED, the secondary particles have a particle size of 1 to 10 μm in average, and that the largest particles have a particle size not more than 20 μm. With the average particle size exceeding 10 μm, a precipitation is apt to take place in the step of dispersion into a sealing material such as epoxides so that uniform dispersion may become difficult. With the average less than 1 μm, inconvenience is engendered such that the emission characteristic deteriorates or that it becomes arduous to handle the powder.

With respect to the disintegrating or crushing treatment mentioned above, although the α-sialon mass or block excels in crushability and can easily be crushed by such as a mortar, the use of a standard crusher such as a ball mill or a vibration mill is naturally permissible.

Further, an α-sialon phosphor obtained according to the present invention comprises primary particles with less secondary agglomerates and has the feature that free surfaces of the primary particles are well developed. The primary particles have a particle size in average of 1 to 10 μm and an aspect ratio in average of 2 or less. It can be seen, therefore, that in accordance with the α-sialon phosphor of the present invention, particles of a particle size which exhibits excellent fluorescent characteristic can be obtained stably. Particle of an average particle size of 2 to 6 μm which are particularly preferable can be obtained. Here, the average particle size of primary particles are calculated upon measuring 100 particles or more according to a technique such as the intercept method or image analysis from observed images of a magnification which allows a primary particle of the phosphor to be discerned by a scanning electron microscope (SEM).

As can be seen from the foregoing description, the α-sialon phosphor of the present invention is that activated by a rare earth element, and combines advantages of the α-sialon as the host material. Thus, the α-sialon phosphor of the present invention has the features that it is excellent in chemical, mechanical and thermal properties, is stable as a phosphor material and can be expected of a prolonged service life, and can restrain the thermal relaxation phenomena that cause a loss of excitation energy.

The α-sialon phosphor of the present invention using Ca as a solid-dissolving element has the α-sialon structure stabilized. Consequently, with transformation to the β' phase hard to occur, a single-phase material only of the α-sialon can easily be obtained. Thus, the α-sialon phosphor of the present invention in which such as Ca is solid-dissolved together with a rare earth element as luminescence center has the advantages that it is high in light emission efficiency with rising temperature, low in decrease of emission efficiency, and wider in working temperature range than the conventional phosphors.

Third Form of Implementation

According to the third form of implementation of the present invention, an α-sialon that is represented by general formula: $(Ca_X, M_Y)(Si, Al)_{12}(O, N)_{16}$ (wherein M represents one or more elements selected from the group which consists of Ce, Pr, Eu, Tb, Yb and Er and wherein $0.3<X+Y<1.5$ and $0<Y<0.7$) can be made by a method which includes: heating a mixed powdery material comprising powders of (a) silicon nitride, (b) aluminum nitride, (c) calcium fluoride and (d) an oxide or nitride of M and at need (e) aluminum oxide.

The aforementioned powder mixture as the raw materials is formulated together so that the α-sialon of a desired composition is obtained, into a form as they are or granular or molded, which is loaded in a vessel of which a portion in contact with the raw materials is made of boron nitride and which is then heated at a temperature in a range of 1600 to 2000° C. It is undesirable if the temperature at which the powder mixture is heated is less than 1600° C., since the unreacted materials are then apt much to remain, and so is it if the heating temperature exceeds 2000° C., since then not only does intergranular sintering occur but also thermal decomposition of the silicon nitride raw material and α-sialon proceeds. The preferred temperature range for synthesis is from 1700 to 1850° C. The time period for heating at the temperature mentioned above is desirably a measure of 1 to 20 hours. It is undesirable if the heating time period is less than 1 hour, since unreacted materials are then apt to remain, and so is it if the heating time period exceeds 20 hours, since then intergranular sintering goes too far and the cost goes up.

The atmosphere in which the heating is to occur may be nitrogen under normal pressure at a temperature less than 1850° C., but at a temperature not less than 1850° C. nitrogen of higher pressure is preferably used in order to restrain the thermal decomposition of silicon nitride raw material and α-sialon. Nitrogen pressure not more than 1 MPa is preferably selected, otherwise a considerable amount of cost will be necessitated for the synthesis furnace.

The α-sialon made in this way can be pulverized into a desired particle size at need to obtain an α-sialon phosphor. This pulverization can be by mild crushing such as of disintegrating agglomerates to give rise to make primary particles of a particle size in a range of 1 to 10 μm in average.

After the heat treatment, removing residual fluoride by acid treatment can improve the light emission characteristic of the α-sialon phosphor. This permits diminishing fluorine that remains in the α-sialon and obtaining an α-sialon phosphor which consisting of α-sialon of high purity is excellent in fluorescent characteristic.

A portion of calcium fluoride as mentioned above can be substituted with calcium oxide or a calcium compound which when heated gives rise to calcium oxide. As regards the proportion of the compound such as calcium oxide to be substituted for a portion of calcium fluoride, the proportion of calcium fluoride is preferably 10 to 100 mole % (molar ratio of calcium). The case of this proportion being 100 mole % represents the case that all the calcium is fluoride. If the proportion is less than 10 mole %, an abundant amount of nucleation of α-sialon in the initial stage of synthesis may make it difficult to make the primary particles larger in size and to limit the intergranular sintering and make it impossible to fully achieve the effects of the present invention.

While calcium contained in calcium fluoride is solid-dissolved into α-sialon as with calcium oxide, and much of fluorine is combined with other metallic elements to form low boiling point compounds for volatilization, it is considered that a portion of fluorine as a crystalline or amorphous phase remains in the product.

Inasmuch as solid dissolving of calcium into α-sialon proceeds at a temperature lower than the melting point of a luminescent element, if the addition of calcium fluoride to augment the amount of formation of the liquid phase is excessive, solid-dissolving of the luminous element is restrained and the emission quality is lowered.

Consequently, when α-sialon represented by general formula: $(Ca_X, M_Y)(Si, Al)_{12}(O, N)_{16}$ (wherein M represents one or more elements selected from the group which consists of Ce, Pr, Eu, Tb, Yb and Er) is made by the method using calcium fluoride as a raw material, it is then necessary to mix the raw materials together so that the restraints of $0.3<X+Y<1.5$ and yet of $0<Y<0.7$ are satisfied.

The particle size of primary particles can be controlled not only by the heat treatment conditions but also by the proportion to which calcium fluoride amounts since the particle size is increased as that proportion is increased if the heat treatment conditions are fixed.

Mention is next made of the function of fluorine added as an impurity in the methods of making an α-sialon and α-sialon phosphor according to the third form of implementation of the present invention.

In the past, when a phosphor made of α-sialon is to be made, a method has been taken to use as raw materials silicon nitride, aluminum nitride, aluminum oxide, a calcium compound such as calcium oxide and an oxide of a rare earth element and to heat them for reactions. The reactions then proceed in a way in which in surface oxide layers silicon nitride and aluminum nitride react with calcium oxide and oxide of rare earth element as the luminescence center at a high temperature to form a liquid phase into which silicon nitride and aluminum nitride dissolve to cause α-sialon to re-precipitate. In this case, however, the liquid phase forming temperature is as relatively high as around 1500° C., and synthesizing at more than such a temperature tends to cause grain growth and sintering to concur with formation of α-sialon and to bond the primary particles firmly together. In contrast, the method according to the third form of implementation of the present invention makes it possible to obtain the α-sialon in which particle-particle sintering is as limited as possible by using calcium fluoride as a part of raw materials to retard nucleation of α-sialon while causing the grains to grow.

As to a reason why such grain growth occurs, the present inventors infer the mechanism that follows. Thus, although in a liquid phase made with calcium fluoride dissolved, the presence of fluorine limits diffusion of substances and formation of α-sialon in the initial stage, the treatment at high temperature in which fluorine gradually forms a low-boiling point compound and volatilizes causes the substance diffusion to proceed rapidly. And it is considered that with a small number of α-sialon particles growing fast, large α-sialon particles such that primary particle size exceeds 1 μm are formed at a temperature which is lower and in a time period which is shorter than with the prior art.

In the synthesis method for α-sialon according to the present invention, it is inferred that since calcium fluoride as an ionic compound high in polarity exists in a molten state on covalent α-sialon particle surfaces to limit anisotropy stemming from hexagonal crystallization and make the particles nearly spherical and free-surfaced, the particles are obtained which are large and uniform in particle size. The α-sialon made in this manner can be pulverized easily by crushing even of a disintegrating standard into a particle size suitable for a phosphor.

Fourth Form of Implementation

According to the fourth form of implementation of the present invention, an α-sialon that is represented by general formula: $(Ca_x, M_y)(Si, Al)_{12}(O, N)_{16}$ (wherein M represents one or more elements selected from the group which consists of Ce, Pr, Eu, Tb, Yb and Er and wherein $0.3<X+Y<1.5$ and $0<Y<0.7$) can be made by a method which includes: heating a mixed powdery material comprising powders of (a) silicon nitride, (b) aluminum nitride, (c) calcium fluoride and (d) an oxide or nitride of M and at need (e) aluminum oxide and incorporating as a flux a fluoride of an element of II A group except Be, Mg and Ca or an element of IV A group to form a product thereof. The product thus obtained becomes an α-sialon of the present invention.

This method of making differs from the method of making an α-sialon according to the third form of implementation in that the mixed powdery material incorporates, as a substitute for calcium fluoride and as a flux, a fluoride of an element of II A group except Be, Mg and Ca or an element of IV A group. The raw powdery material with this exception and its heating temperature, time period and atmosphere and the like are identical to those in the α-sialon making method of the third form of implementation, of which a repeated explanation is therefore omitted.

The α-sialon made in this way can at need be pulverized or crushed into a desired particle size and may at need have its residual flux removed to make an α-sialon phosphor of the fourth form of implementation. The crushing may be as mild as being even of a disintegrating standard to form primary particles of 1 to 10 μm in average particle size.

According to a method of making an α-sialon in this fourth form of implementation, heating a raw material comprising silicon nitride, aluminum nitride, aluminum oxide, a calcium compound such as calcium oxide and an oxide of a rare earth element upon incorporating a fluoride as mentioned above as a flux gives rise to the same effects obtained using the calcium fluoride material. This is due to the facts that each element of the flux without solid-dissolving into α-sialon does not affect a composition exerting an influence on the emission characteristic and that such a fluoride has a boiling point higher than the temperature at which α-sialon can be synthesized, and fully exhibits its function as the flux at high temperature.

According to the fourth form of implementation, adding a fluoride as a flux to a portion of the raw material to retard nucleation of α-sialon while causing grains to grow can give rise to an α-sialon in which intergranular sintering is as limited as possible. And mildly crushing the α-sialon into an average particle size of 1 to 10 μm makes it possible to obtain an α-sialon phosphor that is high in emission characteristic.

The present invention is further described below with respect to specific examples thereof.

Example 1

An α-sialon raw powdery material in Example 1 was compounded by: 50.3 mole % of silicon nitride powder (made by Ube Kosan as of grade E10), 37.7 mole % of aluminum nitride powder (made by Tokuyama as of F grade), 0.6 mole % of europium oxide powder (made by Shin-etsu Kagaku Kogyo as of grade RU) and 11.4 mole % of calcium fluoride powder (made by Wako Jun-yaku Kogyo as a special reagent). In this compound composition, $CaF_2/(CaCO_3+CaF_2)=100$ mole %.

The raw material powders were subjected to wet ball mill mixing in an ethanol solution by a pot and balls of silicon nitride material for a time period of 3 hours, then filtered and dried to obtain a mixed powder.

The mixed powder in an amount of 100 grams was loaded into a crucible made of boron nitride and having an inner diameter of 100 mm and a height of 60 mm, in which it was heat-treated in a nitrogen atmosphere of atmospheric pressure by an electric furnace of carbon heater at temperature of 1700° C. for a time period of 6 hours. A product thus obtained was disintegrated by an agate mortar into particles which were passed through a sieve with an aperture of 45 μm to obtain a synthetic powder as an α-sialon phosphor. The synthetic powder in Example 1 had a color of yellow according to visual observation. The α-sialon obtained had a composition of $Ca_{0.72}Eu_{0.08}(Si, Al)_{12}(O, N)_{16}$ where a calculation showed $X+Y=0.80$ and $Y/(X+Y)=0.1$.

Example 2

In Example 2, a compound composition used was the same as that in Example 1 except that 11.4 mole % of calcium fluoride powder in the raw powdery material of Example 1 was substituted with 5.7 mole % of calcium fluoride powder (made by Wako Jun-yaku Kogyo as a special reagent) and 5.7 mole % of calcium carbonate powder (made by Kanto Kagaku as a special reagent) to make an α-sialon and an α-sialon phosphor of Example 2, wherein $CaF_2/(CaCO_3+CaF_2)=50$ mole %. The synthesized α-sialon phosphor powder has a color of yellow according to visual observation. The synthesized α-sialon has a composition of $Ca_{0.72}Eu_{0.08}(Si, Al)_{12}(O, N)_{16}$ where a calculation showed $X+Y=0.80$ and $Y/(X+Y)=0.1$.

Example 3

In Example 3, a compound composition used was the same as that in Example 1 except that 11.4 mole % of calcium fluoride powder in the raw powdery material of Example 1 was substituted with 2.9 mole % of calcium fluoride powder (made by Wako Jun-yaku Kogyo as a special reagent) and 8.5 mole % of calcium carbonate powder (made by Kanto Kagaku as a special reagent) to make an α-sialon and an α-sialon phosphor of Example 3, wherein $CaF_2/(CaCO_3+CaF_2)=25$ mole %. The synthesized α-sialon phosphor powder has a color of yellow according to visual observation. The synthesized α-sialon has a composition of $Ca_{0.72}Eu_{0.08}(Si, Al)_{12}(O, N)_{16}$ where a calculation showed $X+Y=0.80$ and $Y/(X+Y)=0.1$.

Example 4

In Example 4, a raw powdery material whose compound composition was the same as that in Example 1 except that 11.4 mole % of calcium fluoride powder was substituted with 11.4 mole % of calcium carbonate powder (made by Kanto Kagaku as a special reagent) and 5 outer mole % of $BaF_2$ was further incorporated as a flux was heat-treated in the same manner as in Example 1. A synthetic powder thus obtained by the heat treatment was disintegrated by the mortar into particles which were passed through a sieve with an aperture of 1 mm and then after being subjected to wet ball mill crushing in ethanol solution by a pot and balls of silicon nitride material and balls for a time period of 5 hours, filtered and dried. The resultant powder was dispersed in a nitric acid solution of 2 mole % concentration, agitated at temperature of 50° C. for a time period of 10 hours, washed with water, filtered and dried to obtain an α-sialon powder.

For the purposes of comparison with the present invention, comparative examples below were prepared.

Comparative Example 1

In Comparative Example 1, a compound composition used was the same as that in Example 1 except that 11.4 mole % of calcium fluoride powder in the raw powdery material of Example 1 was substituted with 11.4 mole % of calcium carbonate powder (made by Kanto Kagaku as a special reagent) to make an α-sialon and an α-sialon phosphor of Comparative Example 1, wherein $CaF_2/(CaCO_3+CaF_2)=0$ mole %. The synthesized α-sialon phosphor powder has a color of yellow according to visual observation. The synthesized α-sialon has a composition of $Ca_{0.72}Eu_{0.08}(Si, Al)_{12}(O, N)_{16}$ where a calculation showed X+Y=0.80 and Y/(X+Y)= 0.1.

Comparative Example 2

In Comparative Example 2, a compound composition was the same as that in Example 1 except that the raw powdery material used comprises 45.2 mole % of silicon nitride powder, 33.8 mole % of aluminum nitride powder, 0.5 mole % of europium oxide powder (made by Shin-etsu Kagaku Kogyo as of grade RU) and 20.5 mole % of calcium fluoride powder (made by Wako Jun-yaku Kogyo as a special reagent) to make an α-sialon and an α-sialon phosphor of Comparative Example 2, wherein $CaF_2/(CaCO_3+CaF_2)=100$ mole %. The color of the synthesized α-sialon phosphor powder according to visual observation was different from those in Examples 1 to 3 and Comparative Example 1 and was slightly yellowish white. The synthesized α-sialon has a composition of $Ca_{1.52}Eu_{0.08}(Si, Al)_{12}(O, N)_{16}$ where a calculation showed X+Y=1.6 and Y/(X+Y)=0.05.

The raw material compositions (mole %) and $CaF_2/(CaCO_3+CaF_2)$ values of Examples 1 to 3 and Comparative Examples 1 to 2 are shown in FIG. 1.

Mention is next made of a method of measuring various properties of Examples 1 to 4 and Comparative Examples 1 to 2. Total impurity fluorine contents and solid-dissolved fluorine contents of the synthetic powders obtained in these Examples and Comparative Examples were measured as stated below.

Each synthetic powder in an amount of 0.3 g was taken on a platinum boat, set in a tubular furnace, and heated at temperature of 950° C. for a time period of 15 minutes while being aerated with oxygen humidified with pure water heated to 80° C. to distill fluorine as hydrofluoric acid. With an absorbing tube filled in advance with an ion-chromatographic eluting solution, the absorbing solution after distillation diluted with pure water was subjected to ion-chromatography to quantitatively determine fluorine. Then, the total amounts of impurity fluorine were measured with the synthetic powders as they were obtained. In the measurement of a solid-dissolved fluorine amount, the synthetic powder was dispersed in a nitric acid solution of 2 mole % concentration, treated at temperature of 50° C. for the time period varied and had the second phase removed to determine fluorine quantitatively. The value at which fluorine in amount comes to be unvaried was found as the solid-dissolved fluorine amount. In the present Examples and Comparative Examples, a treatment for 6 to 8 hours made the fluorine amount unvaried.

Further, for each of the synthetic powders of the present Examples and the Comparative Examples, the crystalline phase was identified by the X-ray diffraction (XRD) method and quantitatively evaluated by the Rietveld analysis, and the particle size distribution was measured by the laser diffraction scattering method. Also, a scanning electron microscope (SEM) was used to observe the particles, to measure sphere equivalent radii of primary particles from the images obtained and calculate their average value as the average particle size of the primary particles. In the measurement of the primary particle sizes, at least 200 particles were measured.

FIG. 2 is a table showing the crystal phase proportions of α-sialon, the total amounts of impurity fluorine (total F contents; ppm unit), the amounts of solid-dissolving fluorine (contents of solid-dissolving F; ppm unit), the average particle sizes (μm) of primary particles by SEM observation and the average particle sizes (μm) in particle size distribution measurement by laser diffraction scattering method in Examples 1 to 3 and Comparative Examples 1 and 2.

The product in Example 1 is seen from the table of FIG. 2 to be composed of α-sialon (95% by weight), AlN (3% by weight), and EuOF (2% by weight). EuOF in this composition is due to the fact that Eu not solid-dissolved in α-sialon forms the second phase of Eu. The total amount of impurity fluorine (total F content) and the amount of solid-dissolving fluorine (content of solid-dissolving F) were 4000 ppm and 80 ppm, respectively. It has been found that the total content of fluorine contained in the α-sialon phosphor is about 1/10 of feed amount, and is mostly vaporized while in heat treatment, the residue of which exists in the form of EuOF phase or amorphous phase. The average primary particle size of the α-sialon phosphor by the SEM observation was 5.8 μm, and that in the particle size distribution measurement by the laser diffraction scattering method was 8.2 μm.

The product in Example 2 is seen from the table of FIG. 2 to be composed of α-sialon (100% by weight). The total amount of impurity fluorine and the amount of solid-dissolving fluorine were 1000 ppm and 60 ppm, respectively. The average primary particle size of the α-sialon phosphor by the SEM observation was 4.7 μm, and that in the particle size distribution measurement by the laser diffraction scattering method was 7.5 μm.

The product in Example 3 is seen from the table of FIG. 2 to be composed of α-sialon (100% by weight). The total amount of impurity fluorine and the amount of solid-dissolving fluorine were 400 ppm and 40 ppm, respectively. The average primary particle size of the α-sialon phosphor by the SEM observation was 3.4 μm, and that in the particle size distribution measurement by the laser diffraction scattering method was 6.3 μm.

In contrast, the product in Comparative Example 1 is seen from the table of FIG. 2 to be composed of α-sialon (100% by weight). With no fluorine added, the total amount of impurity fluorine and the amount of solid-dissolving fluorine are both less than 10 ppm. The average primary particle size of the α-sialon phosphor by the SEM observation was 0.8 μm, and that in the particle size distribution measurement by the laser diffraction scattering method was 7.2 μm.

The product in Comparative Example 2 is seen from the table of FIG. 2 to be composed of α-sialon (91% by weight), AlN (3% by weight), and EuOF (4% by weight). The total amount of impurity fluorine and the amount of solid-dissolving fluorine were 23000 ppm and 100 ppm, respectively. The average primary particle size of the α-sialon phosphor by the SEM observation was 0.8 μm, and that in the particle size distribution measurement by the laser diffraction scattering method was 7.2 μm.

Mention is next made of shapes of Examples and Comparative Examples and their emission spectra by external light excitation.

FIG. 3 are photographs showing scanning electron microscopic (SEM) images of α-sialon phosphors in (a) Example 1, (b) Example 2 and (c) Comparative Example 1, respectively.

Figure 4:
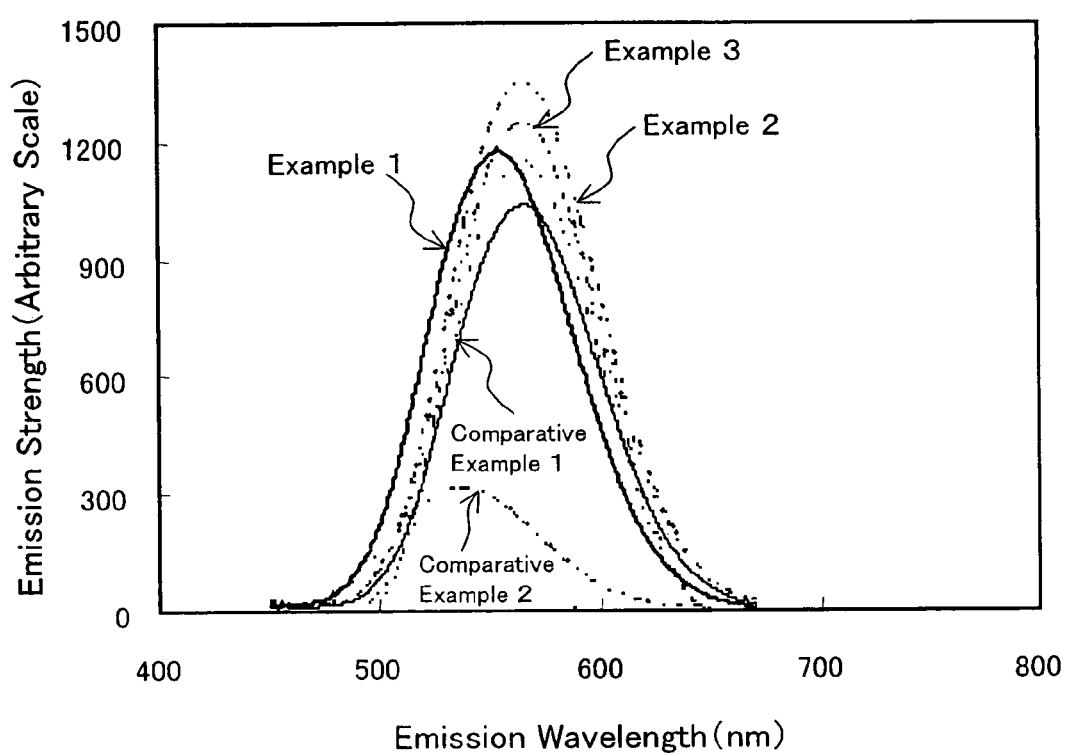
FIG. 4 is a graph illustrating the emission spectra of α-sialon phosphors by excitation at 400 nm in Examples 1 to 3 and Comparative Examples 1 and 2.

FIG. 4 is a graph illustrating emission spectra of α-sialon phosphors by excitation at 400 nm in Examples 1 to 3 and Comparative Examples 1 and 2. In the graph of FIG. 4, the ordinate axis represents emission strength (in arbitrary scale) and the abscissa axis represents emission wavelength (in nm). The Examples and Comparative Examples are each in a state that the total amount of impurity fluorine shown in FIG. 2 is contained in which the emission spectra were measured with a fluorescence spectrophotometer.

The α-sialon according to Example 1 as can be seen from FIG. 3 is made of primary particles of which free surfaces are well developed, which exist in a relatively mono-dispersed state. In the composition, a shortage of oxygen causes solid-dissolving atoms to exist more than the limit of solid solution and hence AlN and EuOF to exist as the second phases. As is apparent from FIG. 4, however, it is seen that in response to an external light excitation applied thereto at 400 nm, the α-sialon phosphor according to Example 1 had an emission spectrum of about 500 nm to 650 nm with its peak wavelength at about 550 nm, showing that the same in emission strength is superior to Comparative Example 1. It is also seen that the peak wavelength in Example 1, as a result of Ca preferentially solid-dissolving in α-sialon to make the ratio of Eu/Ca smaller, has a shift towards the lower wavelength side from that in Comparative Example 1.

Examples 2 and 3 differ from Example 1 in that both calcium fluoride and calcium carbonate are used as a calcium source. α-sialon phosphors in Examples 2 and 3 have primary particles larger in size and are each of a powder obtained in which particle-to-particle bond is not firm. In this case, most of fluorine evaporated while α-sialon is being synthesized and as a result a synthetic powder was obtained in which the crystal phase consisted of 100% by weight of α-sialon. Each of these phosphors is made of primary particles of which free surfaces are well developed, which exist in a relatively mono-dispersed state. It has also been found that as the proportion of calcium fluoride mixed is decreased, the particle size of primary particles tends to decrease and the intergranular sintering to progress.

As is apparent from FIG. 4, it is seen that in response to an external light excitation applied thereto at 400 nm, the α-sialon powders according to Examples 2 and 3 had emission spectra of about 500 nm to 650 nm with its peak wavelength at about 570 nm. These emission spectra compared with those in Example 1 and Comparative Examples have been found to be the most favorable.

The synthetic powder obtained in Example 4 as a result of its X-ray diffraction was found to be of single α-sialon phase and to comprise primary particles whose average diameter was 2.5 μm. Its emission spectrum measured with the fluorescence spectrophotometer in response to excitation at 400 nm was similar in both peak wavelength and spectral intensity to that in Example 3.

In contrast, the α-sialon phosphor obtained in Comparative Example 1, as is apparent from FIG. 3(c), comprises secondary particles which are sintered from a large number of particles of 1 μm or less in size and also have their particle distribution widespread. Also, as is apparent from FIG. 4, in response to excitation at 400 nm Comparative Example 1 had an emission spectrum of about 500 nm to 650 similar to Examples 2 and 3 but its emission strength was found to be weak.

In the α-sialon, too, obtained as a synthetic powder in Comparative Example 2, the presence of solid-dissolving atoms of an element more than the limit of solid solution caused AlN and EuOF to exist as the second phase. From the diffraction strengths of X-ray diffraction, EuOF was found to be considerably lager in amount here than in Example 1. And the emission characteristic of this powder was found to be markedly inferior to those in Examples 1 to 4 and Comparative Example 1.

From the results mentioned above, it is seen that an α-sialon phosphor that incorporates a proper amount of fluorine in accordance with the present invention is superior in emission characteristic by eternal light excitation to that conventional which contains no fluorine and so is to that which contains fluorine excessively.

INDUSTRIAL APPLICABILITY

In accordance with the present invention, there is provided an α-sialon having a preferable composition as a phosphor. An α-sialon phosphor is excellent in emission characteristic as having a particle size which is adequate as a phosphor for white LEDs and free of surface defects. Further, in accordance with the present invention, an α-sialon phosphor suitable for a white LED using a blue or ultraviolet LED as its light source can be made stably and in a large quantity.

According to the α-sialon of the present invention, an α-sialon powder of a composition and particle size which are ideal for a phosphor can be obtained stably. Further, an α-sialon phosphor that can be made by having the thus made α-sialon worked under mild crushing treatment conditions is free of the surface defect that may otherwise be introduced due to working strain, and is therefore excellent in emission characteristic.

Accordingly, an α-sialon phosphor of the present invention can be used as a phosphor for a white light emitting diode using a blue or ultraviolet light emitting diode as its light source.

Further, a method of making an α-sialon phosphor in accordance with the present invention which can furnish it stably and in a large quantity is extremely useful in industry.

What is claimed is:

1. An α-sialon which is represented by general formula: $(M1)_X(M2)_Y(Si, Al)_{12}(O, N)_{16}$ (wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$), characterized in that it contains not less than 30 ppm and not more than 1% of fluorine as an impurity.

2. The α-sialon as set forth in claim 1, characterized in that the α-sialon contains 30 to 200 ppm of impurity fluorine.

3. The α-sialon as set forth in claim 1 or claim 2, characterized in that M1 is Ca and that $0.01<Y/(X+Y)<0.7$.

4. An α-sialon phosphor of which an α-sialon is represented by general formula: $(M1)_X(M2)_Y(Si, Al)_{12}(O, N)_{16}$ (wherein M1 represents one or more elements selected from the group which consists of Li, Mg, Ca, Y and lanthanoid (except La and Ce) and M2 represents one or more elements selected from the group which consists of Ce, Pr, Eu, Tb, Yb and Er and wherein $0.3<X+Y<1.5$ and $0<Y<0.7$), characterized in that it comprises particles of the α-sialon containing not less than 30 ppm and not more than 1% of fluorine as an impurity, whose primary particle size in average ranges between 1 and 10 μm.

5. The α-sialon phosphor as set forth in claim 4, characterized in that the α-sialon contains 30 to 200 ppm of impurity fluorine.

6. The α-sialon phosphor as set forth in claim 4 or claim 5, characterized in that M1 is Ca and that $0.01<Y/(X+Y)<0.7$.

7. A method of making the α-sialon phosphor of claim 1, characterized in that the method comprises:
heating a mixed powdery material comprising powders of (a) silicon nitride, (b) aluminum nitride, (c) calcium fluoride and (d) an oxide or nitride of M and at need (e) aluminum oxide to form a product thereof; and
crushing the product into particles of a desired particle size.

8. The method of making the α-sialon phosphor as set forth in claim 7, characterized in that it further comprises after said heat treatment, removing the fluoride that may remain by acid treatment.

9. The method of making the α-sialon phosphor as set forth in claim 7 or claim 8, characterized in that a portion of said calcium fluoride is substituted with calcium oxide or a calcium compound which when heated gives rise to calcium oxide.

10. The method of making the α-sialon phosphor as set forth in claim 9, characterized in that said calcium fluoride has a proportion of 10 to 100 mole %.

11. A method of making the α-sialon phosphor of claim 4, characterized in that the method comprises:
heating a mixed powdery material comprising powders of (a) silicon nitride, (b) aluminum nitride, (c) an oxide or nitride of calcium and (d) an oxide or nitride of M and at need (e) aluminum oxide and incorporating as a flux a fluoride of an element of IIA group except Be, Mg and Ca or an element of IVA group to form a product thereof; and
crushing the product into particles of a desired particle size.

12. The method of making the α-sialon phosphor as set forth in claim 11, characterized in that further comprises subsequent to crushing, removing the flux that may still remain.

13. The method of making the α-sialon phosphor as set forth in claim 7, further characterized in that the α-sialon contains 30 to 200 ppm of impurity fluorine.

14. The method of making the α-sialon phosphor as set forth in claim 11, further characterized in that the α-sialon contains 30 to 200 ppm of impurity fluorine.

15. The method of making the α-sialon phosphor as set forth in claim 7, further characterized in that M1 is Ca and that $0.01<Y/(X+Y)<0.7$.

16. The method of making the α-sialon phosphor as set forth in claim 11, further characterized in that M1 is Ca and that $0.01<Y/(X+Y)<0.7$.

17. The method of making the α-sialon phosphor as set forth in claim 13, further characterized in that M1 is Ca and that $0.01<Y/(X+Y)<0.7$.

18. The method of making the α-sialon phosphor as set forth in claim 14, further characterized in that M1 is Ca and that $0.01<Y/(X+Y)<0.7$.

* * * * *